Jan. 17, 1961 T. P. PEPPER ET AL 2,968,729
APPARATUS FOR DIRECT MEASUREMENT OF MASS PER UNIT AREA
Filed Feb. 19, 1957 2 Sheets-Sheet 1

Inventors
THOMAS PETER PEPPER
ANDREW JOHN PRESSESKY

BY J. Richard Cavanagh

Jan. 17, 1961 T. P. PEPPER ET AL 2,968,729
APPARATUS FOR DIRECT MEASUREMENT OF MASS PER UNIT AREA
Filed Feb. 19, 1957
2 Sheets-Sheet 2

Inventors
THOMAS PETER PEPPER
ANDREW JOHN PRESSESKY
by: J. Richard Cavanagh

United States Patent Office 2,968,729
Patented Jan. 17, 1961

2,968,729
APPARATUS FOR DIRECT MEASUREMENT OF MASS PER UNIT AREA

Thomas Peter Pepper, Tonawanda, and Andrew John Pressesky, Snyder, N.Y., assignors to Canadian Curtiss-Wright Limited, Oakville, Ontario, Canada Filed Feb. 19, 1957, Ser. No. 641,090

Claims priority, application Canada Feb. 26, 1956

1 Claim. (Cl. 250—83.6)

This invention relates to an apparatus for the direct measurement of mass per unit area of a subject material and may be applied to the direct measurement of the thickness or density of the material.

A variety of instrumentation has been provided heretofore for subjecting a subject material to radiation from a gamma or beta radiation source whereby the detection of the radiation energy which passes through the material represents upon comparison with a reference, a measurement of the change in thickness or the density from a reference material. Such prior devices are used for detecting a change in thickness where the density of the material is known and alternatively are used for detecting a change in density when the thickness is known. In either case, reference must be made to radiation energy emitted from a standard source or to some other convenient standard whereby the measurement is of the comparative class. In general, the measured radiation and the reference standard are utilized in cancelling relationship in suitable electronic circuitry or equivalent whereby a signal voltage is obtained representing the change in thickness or density of the material being measured from the standard reference. The patent to Leighton et al., 2,675,483 shows a class of apparatus operating in accordance with a comparative type of measurement system of the type referred to, said patent being assigned to the same assignee as the instant case.

As distinct from a comparative method of measurement, the invention provides and has for its main object the provision of an apparatus for the direct measurement of the thickness or density of a subject material as contrasted with the comparative measurement of a change in thickness or density of a material by former instrumentation of the radiation inspection class.

Other objects of the invention will be appreciated by a study of the following specification taken in conjunction with the accompanying drawings.

Figure 1:
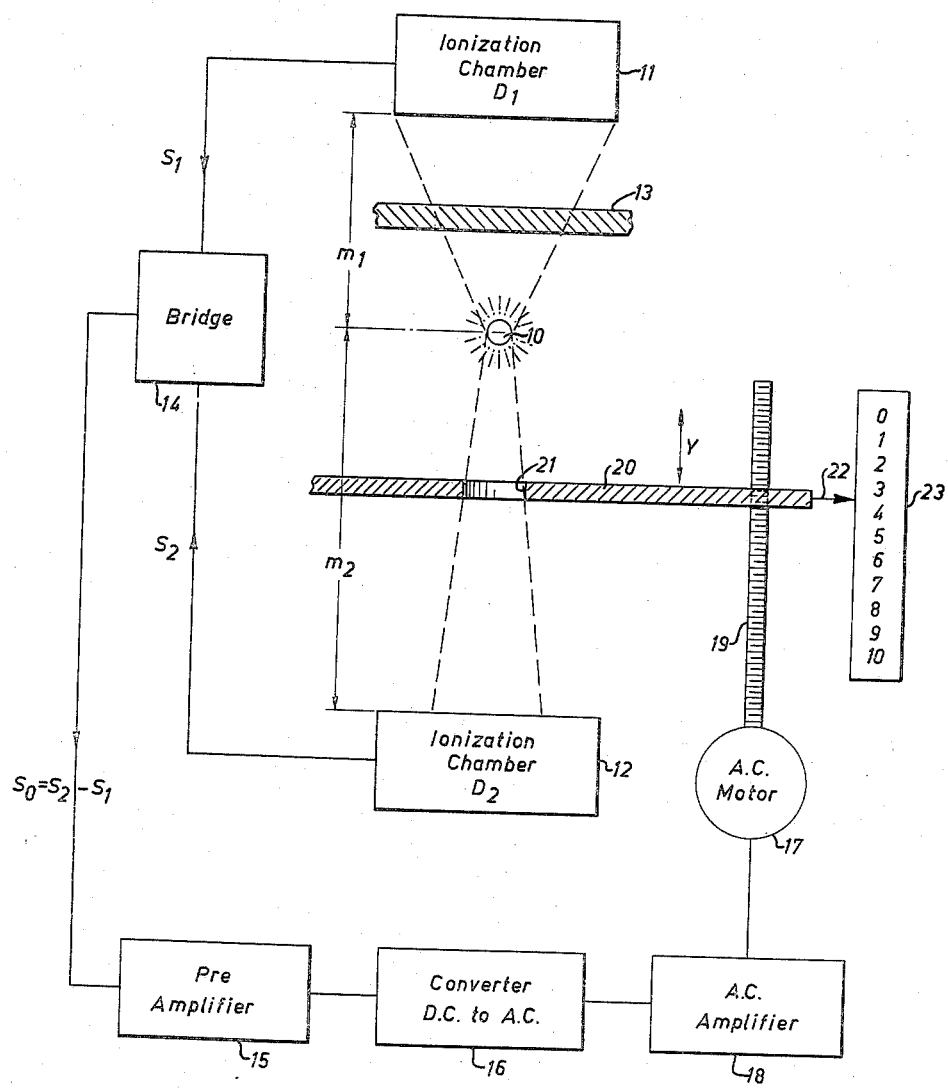
Figure 1 is a diagrammatic illustration of apparatus of the invention having iris means adapted for control of beta radiation.

Referring to Figure 1, a source 10 of beta radiation is supported in fixed relation at distances $m_1$ and $m_2$ between detectors $D_1$ and $D_2$ designated by numerals 11 and 12 adapted to generate an electrical signal responsive to radiation received from the source. A subject material 13 adapted to be measured in thickness or density as the case may be, is shown located between the detector $D_1$ and the source 10. The direct current signals from the ionization chambers, which latter may be of any of the suitable conventional constructions such as of the form shown in U.S. Patent 2,675,483, are connected through an electrical or electronic bridge 14 in bucking relationship to obtain a resulting signal which is amplified through a conventional amplifier 15 and converted to an alternating current signal in the converter 16 from which it is employed to drive the motor or other suitable drive device 17 after passing through a suitable amplifier 18. Motor 17 drives a threaded shaft 19 adapted to move the iris plate 20 having iris opening 21 between the source 10 and the second detector $D_2$ as indicated by the arrows Y. Iris plate 20, according to the invention, carries an indicator 22 adapted to traverse an indicating scale 23.

In operation, signals $S_1$ and $S_2$ from detectors $D_1$ and $D_2$ respectively define a resulting signal $S_0 = S_2 - S_1$; the alternating current equivalent of which drives motor 17 and thus the iris plate 20 to a position at which the radiation passing through iris opening 21 and striking chamber $D_2$, is the same as the residual radiation striking detector $D_1$ after passing through material 13. Assuming a number of samples of material 13 to be of the same thickness, then a change in density between samples will be represented by a different positioning of the iris plate 20 and will therefore give a different reading on the scale 23 as indicated by the indicator 22. Alternatively, assuming all samples to be of the same density, a difference in thickness in the samples will be represented likewise by a difference in corresponding location of the iris plate 20 for a condition $S_0 = 0$ and therefore the scale 23 will represent a direct measurement of thickness.

While radiation detectors of an ionization chamber form have been illustrated for use with a beta radiation source, it will be understood that if the source 10 is a gamma radiation source material, then the detectors $D_1$ and $D_2$ will be of a known form adapted to generate a signal responsive to gamma radiation received thereby. In such instance, however, the iris plate 20 will take the form of a wedge of radiation absorber material such as lead, adapted to be moved transversely into radiation directed toward the detector $D_2$ to absorb radiation passing to the detector $D_2$ to a more or less degree to effect a balanced condition as before described. Accordingly, the term radiation "iris means" as used hereinafter, is intended to embrace an apertured plate for controlling beta radiation or an absorber wedge for controlling gamma radiation and in this sense, is employed as a generic term.

Figure 4:
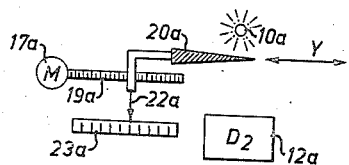
Figure 4 is a diagrammatic illustration of a modified form iris means for gamma radiation control.

The mechanical rearrangement of this modification is illustrated in Figure 4 wherein equivalent components are denoted by the subscript "a."

Figure 2:
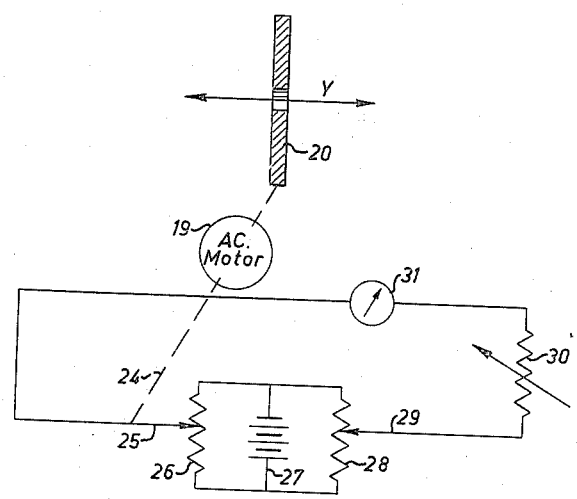
Figure 2 illustrates a modification of a portion of the apparatus of Figure 1 by which a direct reading may be obtained upon a meter or equivalent.

As shown in Figure 2, the motion of the iris plate 20 may be converted to a direct electrical signal such as by causing the motor 19 through suitable mechanical linkage 24 to actuate a variable resistor armature or slider 25 having a resistor element 26 connected in parallel with a source of electrical current 27 and a manually variable resistor 28. The slider 29 of variable resistor 28 is connected in series with potentiometer 30 and a meter or recorder 31 connected to slider 25. The meter or recorder 31, by reason of adjustment of the slider 25 responsive to action of motor 19 and/or motion of iris plate 20, develops a direct reading in meter or recorder 31 proportional to motion of the radiation iris means 20. Adjustment of potentiometer 30 and resistor slider 29 enable the manual adjustment of the scale factor of the reading obtained in the meter or recorder 31.

Figure 3:
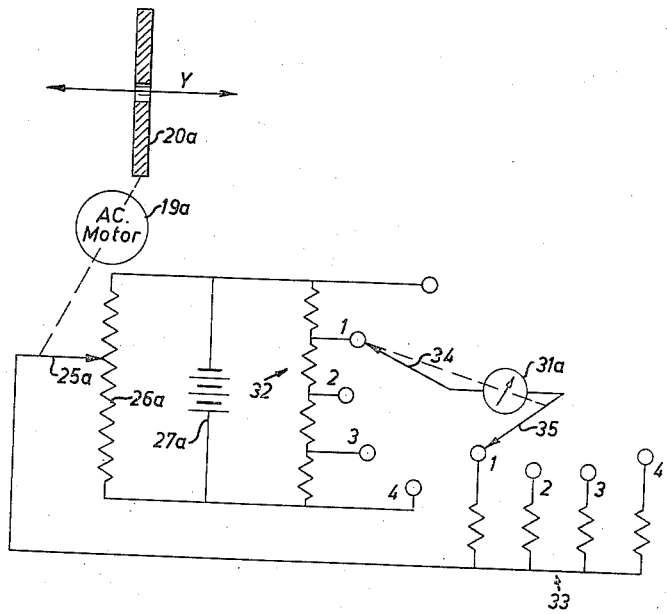
Figure 3 is a further schematic illustrating a modification of the direct reading portion of the measuring device of the invention in which the reading is obtained on a meter or recorder adjustable to selected ranges.

Figure 3 discloses a modification of the schematic illustration of Figure 2 wherein like numerals indicate like components but in which the resistor 28 and potentiometer 30 are represented by stepped resistances 32 and 33 to which contact is made by mechanically ganged sliders 34 and 35 between which is connected a recorder or meter 31a. By this means, the scale of the meter or recorder can be utilized for direct measurement of various densities of material of different selected thicknesses. For example, the scale of the meter or recorder would be accurate for measurement of density of a material of thickness 1 or a material of thickness 2 or a material of thickness 3 and so on. Alternatively, the scale of the meter or recorder, if designed to show a direct thickness measurement, can be matched to materials of different densities by the scale selector means involving ganged adjustment of the arms 34 and 35 to a density 1 and a density 2, a density 3 and so on, as the case may be.

While the apparatus of the invention has been disclosed with reference to an arrangement of apparatus wherein a single radiation source is employed, it will be understood that a separate standard source may be employed for energization of the second detector $D_2$ as is shown in the prior art in the patent above referred to. Accordingly, reference hereinafter to two radiation detectors and a radiation source means for energizing the same, is intended to embrace a construction embodying one or more sources for the detectors.

While the disclosure herein for the purpose of convenience, sets forth the measurement of thickness or density, it will be understood that measurement of the mass per unit area of a subject material is necessarily involved and that the reading obtained is thickness if the density per unit area is constant or is density if the thickness per unit area is constant.

It will also be understood that an indicator whether in mechanical meter or recorder form, may have associated therewith, process controlling means for the subject material. Accordingly, the term "indicating means" is intended to be construed broadly as a utilizable device responsive to the motion of the iris means or drive therefor, whether or not a specific reading is apparent to the operator, so long as it is utilized.

While there has been described what is at present considered a preferred embodiment of the present invention, it will be appreciated by those skilled in the art that various changes and modifications can be made therein without departing from the essence of the invention and it is intended to cover herein all such changes and modifications as come within the true spirit and scope of the appended claim.

What we claim as our invention is:

Apparatus for measuring the mass per unit area of a subject material, comprising in combination: a single source member emitting radiation in two different directions; a detector disposed at a distance from said source member in the path of radiation proceeding in one direction therefrom and adapted to generate an electrical signal responsive to emergent radiation from a subject material disposed between said detector and said member; a second detector disposed at a distance from said source member in the path of radiation emitted in the other direction therefrom and adapted to generate a second electrical signal responsive to radiation received therefrom; radiation iris means between said second detector and said source, being reversibly movable in translation along the latter path and provided with a radiation opening through which the radiation emitted in said other direction passes, for variably controlling the radiation received by said second detector and consequently said second signal; means for generating an iris positioning control signal responsive to the difference in electrical signals generated by said detectors; and electromechanical means for moving said iris means responsive to said control signal along said latter path to reduce said control signal effectively to zero and to provide an indication of a function of the mass per unit area of the subject material.

References Cited in the file of this patent

UNITED STATES PATENTS

| | | |
|---|---|---|
| 2,264,725 | Shoupp et al. | Dec. 2, 1941 |
| 2,403,631 | Brown | July 9, 1946 |
| 2,467,812 | Clapp | Apr. 19, 1949 |
| 2,675,483 | Leighton et al. | Apr. 13, 1954 |
| 2,678,399 | Fay | May 11, 1954 |
| 2,682,801 | Davidson | July 6, 1954 |
| 2,757,290 | Jacobs et al. | July 31, 1956 |